April 28, 1964 G. W. VALENTA 3,131,382

MAGNETIC MEMORY DEVICE

Filed June 15, 1962 2 Sheets-Sheet 1

INVENTOR.
GEORGE W. VALENTA

BY Samuel Kane

ATTORNEY

April 28, 1964 G. W. VALENTA 3,131,382

MAGNETIC MEMORY DEVICE

Filed June 15, 1962 2 Sheets-Sheet 2

INVENTOR.
GEORGE W. VALENTA

BY Samuel Kane

ATTORNEY

United States Patent Office 3,131,382
Patented Apr. 28, 1964

3,131,382

MAGNETIC MEMORY DEVICE

George W. Valenta, Malvern, Pa., assignor to Burroughs Corporation, Detroit, Mich., a corporation of Michigan Filed June 15, 1962, Ser. No. 202,734
17 Claims. (Cl. 340—174)

This invention relates generally to magnetic devices and more particularly to devices of such character which utilize solenoids or coils. While the invention is not limited thereto, it finds special application in the fabrication of magnetic memories of the so-called coincident current type, and therefore the preferred embodiment of the invention will be described hereinafter in connection with such use.

An object of the invention is the provision of means which will minimize the inductance of coils or solenoids.

Another object of the invention is the provision of a magnetic memory with increased storage capacity of magnetic bits of information.

Another object of the invention is the provision of a magnetic memory device which employs driving coils or solenoids, and which supports the coils in such manner that a substantial portion of the heretofore useless empty space in the interior of the coils may now be utilized.

A further object of the invention is the provision of a magnetic memory device employing a novel construction for an array of magnetic memory elements.

Another object of the invention is the provision of means for reducing the time constant of the driving circuits associated with a magnetic memory device, thereby to obtain optimum switching speeds.

In accordance with the above objects and considered first in its broad aspects, the invention utilizes a supporting structure, preferably in the form of a mandrel, of electrically conductive material for supporting an array of magnetic wire memory elements. One or more driving coils or solenoids is wrapped about the mandrel and, preferably, with electrically conductive shielding elements disposed between adjacent driving coils. The mandrel thus acts as a shield by effectively reducing the cross-sectional area of the driving coil flux path, that is, the interior of the driving coils. The shielding elements prevent fringing of the driving coil flux between adjacent coils thereby permitting a greater storage density of magnetic information along the magnetic wire memory elements than heretofore attained.

Since in an illustrated form of the invention the interior of the driving coils is shielded from the flux field of the coils, the mandrel is preferably tubular in construction so that the interior thereof can be advantageously utilized for packaging electrical components associated with the memory system.

The invention will be more clearly understood when the following detailed description of the preferred embodiment thereof is read in conjunction with the accompanying drawings in which.

Turning now to the detailed description, the illustrated embodiment comprises an external mandrel assembly 10 (FIG. 1) and a sub-assembly insert 12 telescopically slidable into the interior of the external mandrel assembly 10 and pluggably attachable thereto.

Figure 4:
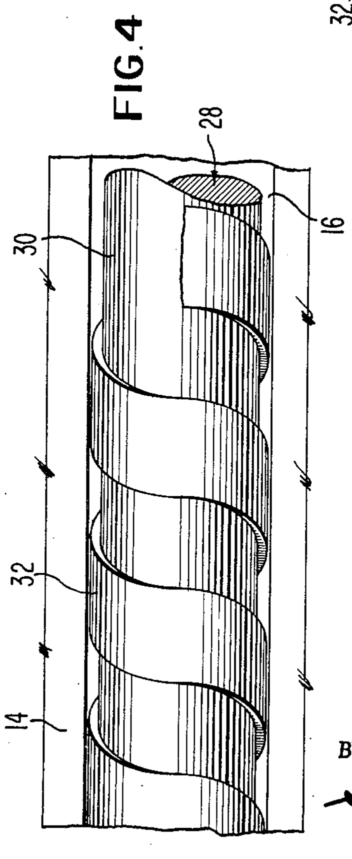
FIG. 4 is an enlarged view of a fragment of a magnetic wire memory element.

The mandrel assembly 10 includes a tubular mandrel 14 (FIGS. 3, 6 and 7) constructed of electrically conductive non-magnetic material of suitable low resistivity such as, for example, copper or aluminum. At its peripheral surface, the mandrel 14 is provided with positioning means for an array of magnetic wire memory elements and, in the present embodiment, this means takes the form of a plurality of elongated slots 16 (FIGS. 4 and 7) formed in the periphery of the mandrel, and extending from one end thereof to the other parallel to its axis.

Figure 1:
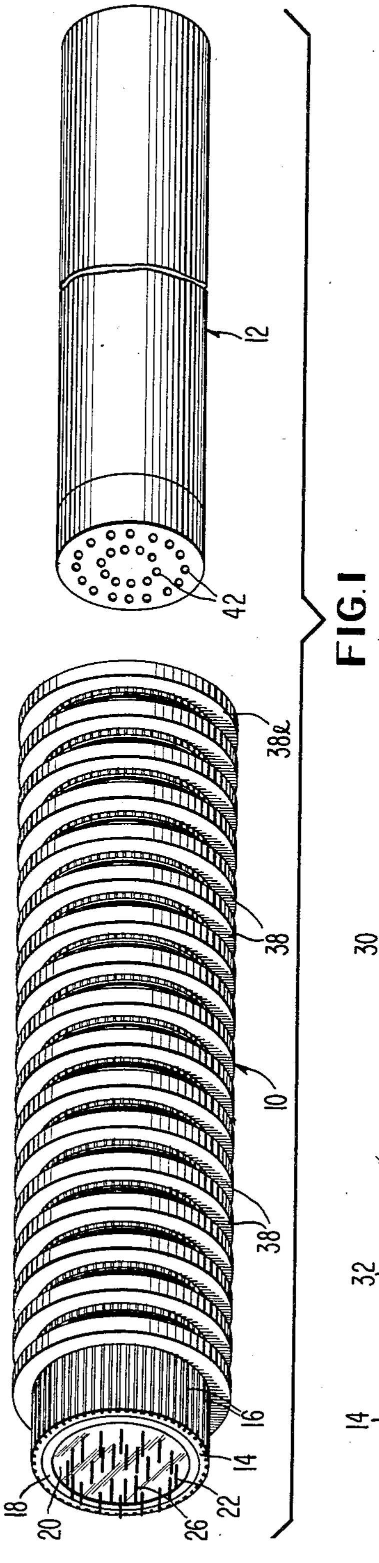
FIG. 1 is an exploded or separated view of a magnetic memory device constructed in accordance with the invention.
Figure 3:
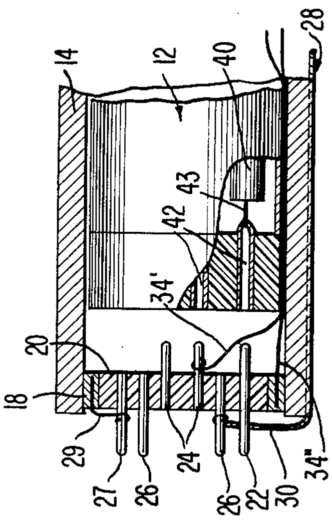
FIG. 3 is an enlarged sectional view of a fragment of the device of FIG. 1 showing a sub-assembly insert of that figure partially inserted into the interior of the external mandrel assembly.

The forward or leftward end of the mandrel, as viewed in FIGS. 1 and 3, is provided with an end closure formed by an electrically conductive ground-ring 18 press-fitted in or otherwise electrically connected to the mandrel 14 and an electrically insulating plug 20. Mounted in the plug 20 is a plurality of each of plug-in pins 22, 24 and 26, respectively, and a ground plug-in pin 27 which is connected to the ground-ring 18 by means of a jumper wire 29.

In each of the slots 16 is placed a magnetic wire memory element 28 (FIG. 4), each of which includes a non-magnetic center conductor 30 and a co-axial layer of magnetic material 32 thereon. As illustrated in the present embodiment, the magnetic wire memory elements 28 are of the form known as twistors, in which a tape wrapped central conductor provides a helical "easy" direction of magnetization, however, the present invention also comprehends the use of other types of memory elements.

Another form of memory element which could be used with the present invention is somewhat similar to the illustrated tape wrapped twistor but differs in one respect, namely, that the magnetic material is plated on a center conductor rather than wrapped thereon and has a helical "easy" direction of magnetization.

The plug-in pins 26 are the input terminals to the conductors 30 of the magnetic wire memory elements 28 and, as shown in FIG. 3, the leftward end of each conductor 30 is connected to a plug-in pin 26. It is understood that, for purposes of clarity and simplicity, only a few of the plug-in pins 22, 24 and 26 are shown in FIG. 3. The same applies to FIG. 1.

Figure 2:
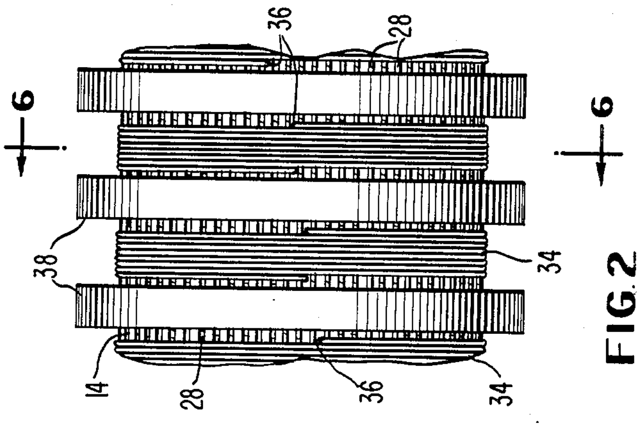
FIG. 2 is an enlarged view of a fragment of an external mandrel assembly shown in FIG. 1.

The driving coils, or solenoids 34, are wrapped about the mandrel 14 in spaced apart relation (FIG. 2) and each is terminated by having its end portions 34′ and 34″ (FIG. 3) pass through openings 36 (FIG. 2) extending through the wall of the mandrel 14 and thence along the interior surface of the wall, as shown in FIG. 3, between the sub-assembly insert 12 and the mandrel 14 toward the end closure of the mandrel, at which place the end 34′ is connected to a plug-in pin 24 and the end 34″ inserted into an opening in the ground-ring 18 and soldered or otherwise connected thereto.

Figure 5:
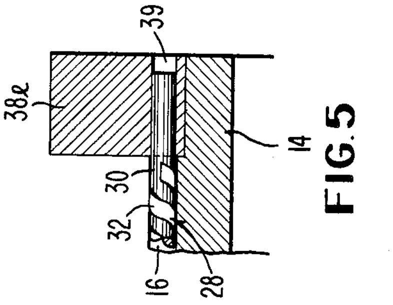
FIG. 5 shows the manner in which the magnetic wire memory elements are grounded to the body of the mandrel.

The mandrel 14 is provided with ridges or radial extensions which, in the present embodment, take the form of electrically conductive non-magnetic shield rings 38 (FIG. 2) closely fitted on the outside of the mandrel 14 in contact therewith, each between adjacent ones of the drive coils 34. As shown in FIG. 5, the rightward end of each conductor 30 is inserted into an individual openng 39 of the end shield ring 38*e*, and soldered or otherwise electrically connected to this shield ring to complete a path to ground.

The sub-assembly insert 12 (FIGS. 1 and 3) contains various electrical components 40, only one of which is shown in FIG. 3, such as resistors, diodes, capacitors, transistors, etc. which comprise certain of the circuit elements and amplifiers associated with the operation of the memory device for providing storage and/or readout functions for the magnetic wire memory elements 28. The plug-in pins 22 are inputs to the elements 40 and the plug-in pins 24 are outputs of the elements 40, and electrical connection is made when the sub-assembly 12 is inserted sufficiently into the mandrel 14 to engage socket terminal connectors 42 of the insert 12, connected to certain of the elements 40 as by leads 43, with the plug-in pins 22 and 24.

When used in conjunction with a computer or other electrical or electronic apparatus, the assembled magnetic memory device illustrated, comprising the external mandrel assembly 10 with the sub-assembly insert 12 telescopically inserted and plugged therein, is plugged into a suitable socket-type receptacle by means of the plug-in pins 22, 26 and 27, thereby electrically connecting the device into the circuitry of the computer, or other apparatus.

In the application of the coincident current memory technique, so-called half-select write currents are applied to selected ones of the magnetic wire memory elements 28 by means of selection circuits shown diagrammatically in block 44 (FIG. 9), and half-select write currents are applied to selected ones of the drive coils 34 by means of selection circuits shown diagrammatically in block 45, the respective half-select currents having at least a portion of their duration in time coincidence. These coincident currents establish or change the state of magnetization of the magnetic material 32 of the magnetic wire memory elements 28 which underlies the cross-over points of the particular drive coils 34 selected, thereby storing information in the magnetic material in specific storage areas. As shown in the diagram in FIG. 9, the intersections of the magnetic wire memory elements 28 and coils 34 represent the information storage areas or bit addresses 46. Information thus stored at the bit addresses may be read out by applying full-select read current pulses to appropriate ones of the drive coils 34, by means of interrogation circuits shown diagrammatically in block 45, and in the opposite direction to that of the half-select write current pulses applied to the coils. It is understood that alternate forms of read-out are also contemplated including the use of reverse current flow to the same half-select wires used for write-in. The applications of the read pulses are of a direction to change the state of magnetization in the magnetic material 32 towards a reference state at the appropriate bit addresses 46, and any resulting changes in flux induce voltages which are read or detected by sensing circuits shown diagrammatically in block 44. It is understood that, for purposes of simplicity, only a few of the magnetic wire memory elements 28 and drive coils 34 of the illustrated embodiment are shown in FIG. 9.

It will now be clear that when the drive coils are operated, either by applying a write pulse or a read pulse, the inductance of these coils will not affect the shielded interior of the mandrel 14 and therefore will not affect the sub-assembly insert 12 therein or any other electrical components which may be placed therein. It will also be perceived that the flux of the driving coils 34 will be limited to the four corner regions of the slots 16 (FIG. 7) and the magnetic material 32 of the wire memory elements 28. Also, the shield rings 38 prevent the flux of adjacent coils 34 from fringing or interfering with each other, so that the coils may be placed closer together thereby increasing the storage capacity or density of the bit address regions 46 along the length of the magnetic memory wire elements 28.

Figures 6, 7, 8, 9, 10:
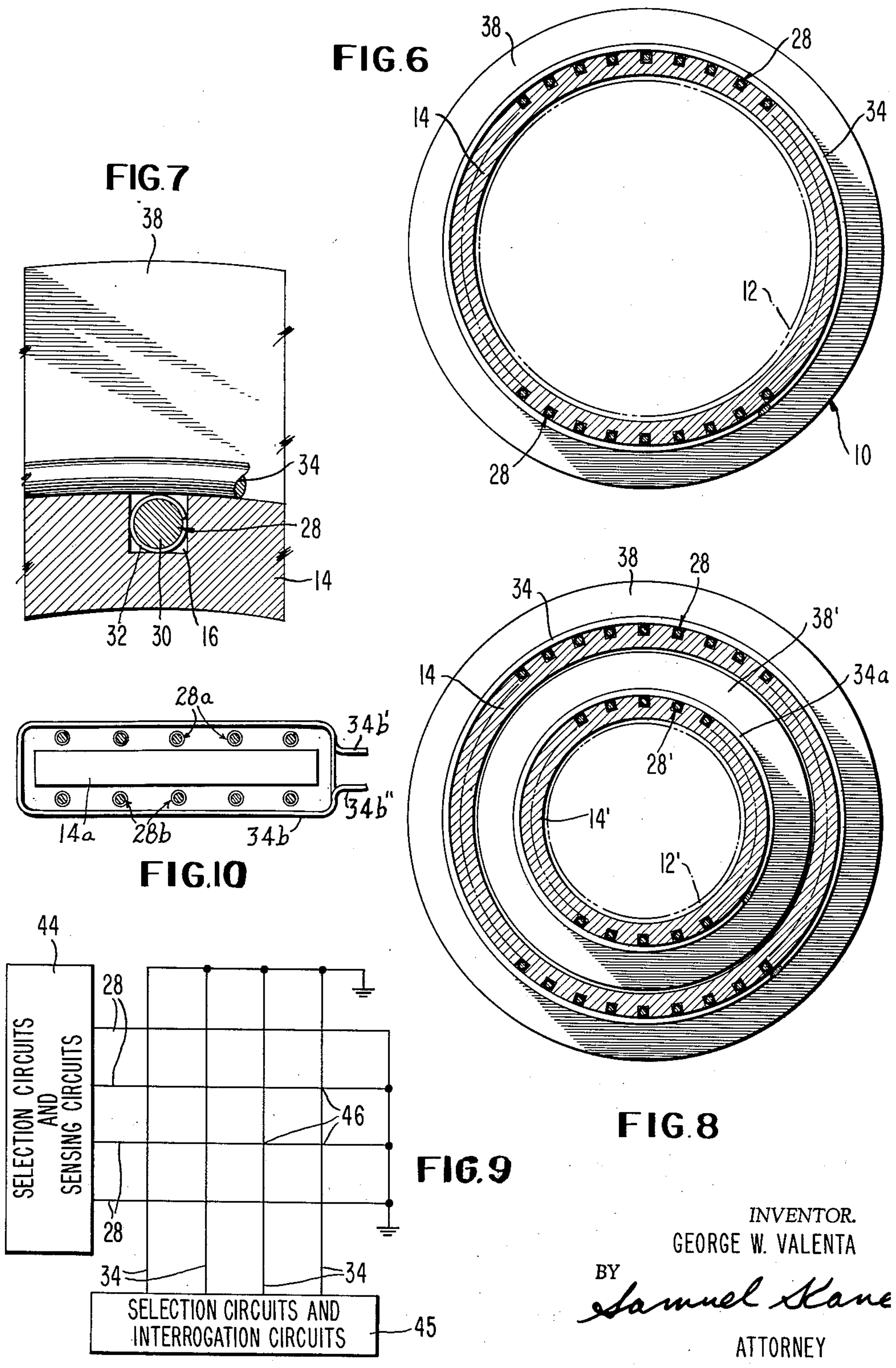
FIG. 6 is an enlarged sectional view taken along line 6—6 of FIG. 2.
FIG. 7 is an enlarged view of a fragment of the external mandrel assembly as viewed in FIG. 6.
FIG. 8 shows a modification of the magnetic memory device.
FIG. 9 is a diagrammatic illustration of the application of coincident current memory technique to the present invention.
FIG. 10 is a diagrammatic view of another modification of the magnetic memory device.

FIG. 8 is a sectional view, similar to FIG. 6, of a modification of the invention in which a group of similar members, including a mandrel 14′, a magnetic wire memory elements 28′ mounted thereon, a plurality of similar coils or solenoids 34*a* and shield rings 38′, is telescopically inserted into the bore of the mandrel 14, the latter also provided with magnetic wire memory elements 28, and a plurality of coils 34 and of shield rings 38. With this alternative construction, the subassembly insert 12′ may be placed at another location if desired, or, as indicated by the dot-dash line, may be inserted telescopically into the opening of the inner mandrel 14′. Also, in this alternative construction, the wall of the mandrel 14 may be regarded as a circular layer of material disposed between the two groups of magnetic wire memory elements 28 and 28′, however, as will appear shortly, it is contemplated that this layer of material in other embodiments may be constructed in shapes other than circular.

The inventive concept, when it is not considered advantageous to house the memory circuitry within the mandrel, the supporting frame may be a flat surface. An upper and lower plane of magnetic wire memory elements would then be separated by a ground plate of conductive but non-magnetic material to reduce the coil air inductance. The driving coils or solenoids could then conveniently encircle the plurality of planes in a manner similar to FIG. 6 if the mandrel of that figure is considered to be squashed into a flat surface. It is understood that this construction more readily lends itself to convenient multi-plane stacks. FIGURE 10, for example, illustrates diagrammatically a multi-plane construction wherein upper and lower planes of magnetic wire memory elements 28*a* and 28*b*, respectively, are adjacent to the upper and lower surfaces of a supporting frame or flat layer 14*a* of electrically conductive non-magnetic material and encircled by one or more driving coils or solenoids 34*b* each of which has end portions 34*b*′ and 34*b*″ for connection to appropriate circuitry.

While there have been shown specific structures exemplary of the principles of the invention it is to be understood that these are but specific forms thereof, and that the invention is capable of being produced in a variety of shapes, sizes and modifications without departing from the true spirit and scope thereof. Accordingly, it is to be understood that the invention is not to be limited by the specific structures disclosed, but only by the subjoined claims.

What is claimed is:

1. A magnetic memory device comprising, an elongated electrically conductive non-magnetic tubular mandrel provided with a series of slots in its peripheral surface each parallel to the axis of the mandrel, means providing a closure for said mandrel at one end thereof, a first group of electrically conductive plug-in pins mounted in said end closure with one of their ends projecting outwardly of the mandrel, a second group of electrically conductive plug-in pins mounted in said end closure and each having an end portion disposed on the inside of the mandrel, a plurality of electrical conductors each mounted in one of said slots and provided with a layer of magnetic material having a helical easy direction of magnetization, one end of each electrical conductor electrically connected to one of said plug-in pins and the other end electrically connected to said mandrel, a plurality of electrically conductive non-magnetic shield rings closely fitted on the outside of the mandrel in spaced apart relation, a plurality of solenoids each wound around the mandrel between adjacent ones of said shield rings and encircling said electrical conductors, each solenoid having its ends electrically connected respectively to certain ones of said plug-in pins, an elongated sub-assembly insert telescopically slidable into the open end of the mandrel and provided at its leading end portion with a group of electrically conductive sockets each for receiving one of said inner end portions of said plug-in pins, said sub-assembly insert containing electrical components electrically connected to said sockets for providing storage and read-out functions for said magnetic material, means for applying write current pulses to selected ones of said electrical conductors and said solenoids, in coincidence, to establish a state of magnetization in the magnetic material associated with the selected electrical conductors, and means for applying read current pulses to selected ones of said solenoids to read out said state of magnetization.

2. A magnetic memory device comprising, an elongated electrically conductive tubular mandrel provided with a series of slots in its peripheral surface each parallel to the axis of the mandrel, a plurality of electrical conductors each mounted in one of said slots and provided with a helical layer of magnetic material, one end of each electrical conductor electrically connected to said mandrel, a plurality of electrically conductive shield rings closely fitted on the outside of the mandrel in spaced apart relation, a plurality of solenoids each wound around the mandrel between adjacent ones of said shield rings and encircling said electrical conductors, an elongated sub-assembly insert telescopically slidable into the mandrel and provided with electrical socket connectors for establishing electrical connection with associated circuitry containing said electrical conductors and said solenoids, said sub-assembly insert containing electrical components electrically connected to said socket connectors, means for applying write current pulses to selected ones of said electrical conductors and said solenoids, said pulses having at least a portion of their duration in time coincidence, to establish a state of magnetization in the magnetic material associated with the selected electrical conductors, and means for applying read current pulses to selected ones of said solenoids to read out said state of magnetization.

3. A magnetic memory device comprising, an elongated electrically conductive tubular mandrel provided with a series of slots in its peripheral surface extending from one end to the other of the mandrel, a plurality of electrical conductors each mounted in one of said slots and provided with a coaxial layer of magnetic material along a substantial portion of its length, one end of each electrical conductor electrically connected to said mandrel, a plurality of electrically conductive shield rings closely fitted on the outside of the mandrel in spaced apart relation, a plurality of solenoids each wound around the mandrel between adjacent ones of said shield rings and encircling said electrical conductors and magnetic material thereon, an elongated sub-assembly insert telescopically slidable into the mandrel and provided with electrical socket connectors for establishing electrical connection with associated circuitry containing said electrical conductors and said solenoids, said sub-assembly insert containing electrical components electrically connected to said socket connectors, means for applying write current pulses to selected ones of said electrical conductors and said solenoids, said pulses having at least a portion of their duration in time coincidence, to establish a state of magnetization in the magnetic material associated with the selected electrical conductors, and means for applying read current pulses to selected ones of said solenoids to read out said state of magnetization.

4. A magnetic memory device comprising, an electrically conductive tubular mandrel provided with a series of slots in its peripheral surface each parallel to the axis of the mandrel, means providing a closure for said mandrel at one end thereof, a first group of electrically conductive plug-in pins mounted in said end closure with one of their ends projecting outwardly of the mandrel, a second group of electrically conductive plug-in pins mounted in said end closure and each having an end portion disposed on the inside of the mandrel, a plurality of electrical conductors each mounted in one of said slots and provided with a layer of magnetic material having a helical easy direction of magnetization, one end of each electrical conductor electrically connected to one of said plug-in pins and the other end electrically connected to said mandrel, a plurality of electrically conductive shield rings closely fitted on the outside of the mandrel in spaced apart relation, a plurality of solenoids each wound around the mandrel between adjacent ones of said shield rings and encircling said electrical conductors, each solenoid having its ends electrically connected respectively to certain ones of said plug-in pins, and a sub-assembly insert telescopically slidable into the open end of the mandrel and provided at its leading end portion with a group of electrically conductive sockets each for receiving one of said inner end portions of said plug-in pins, said sub-assembly insert containing electrical components electrically connected to said sockets for providing storage and/or read-out functions for said magnetic material.

5. A magnetic memory device comprising, an electrically conductive tubular mandrel provided with a series of slots in its peripheral surface each parallel to the axis of the mandrel, means forming a closure for said mandrel at one end thereof, electrically conductive terminal connectors carried by said closure, a plurality of memory elements each comprising an electrical wire conductor mounted in one of said slots and electrically connected at one end to one of said terminal connectors and provided with a layer of magnetic material having a helical easy direction of magnetization, the opposite end of each electrical conductor electrically connected to said mandrel, a plurality of electrically conductive shield rings closely fitted on the outside of the mandrel in spaced apart relation, a plurality of solenoids each wound around the mandrel between adjacent ones of said shield rings and encircling said electrical conductors, each solenoid having its ends electrically connected respectively to certain ones of said terminal connectors, and a sub-assembly insert telescopically slidable into the open end of the mandrel and provided at its leading end portion with electrically conductive terminal connectors each for contacting one of the terminal connectors carried by said closure, said sub-assembly insert containing electrical components electrically connected to the terminal connectors of the sub-assembly insert for providing storage and/or read-out functions for said memory elements.

6. A magnetic memory device comprising, an elongated electrically conductive tubular mandrel provided with a series of slots in its peripheral surface extending along the longitudinal dimension of the mandrel, means forming a closure for said mandrel at one end thereof, electrically conductive terminal connectors carried by said closure, a plurality of electrical conductors each electrically connected to one of said terminal connectors and mounted in one of said slots and provided with a coaxial layer of magnetic material having a helical easy direction of magnetization along a portion of its length, one end of each electrical conductor electrically connected to said mandrel, a plurality of electrically conductive shield rings closely fitted on the outside of the mandrel in spaced apart relation, a plurality of solenoids each wound around the mandrel between adjacent ones of said shield rings and encircling said electrical conductors and magnetic material thereon, each solenoid having its ends electrically connected respectively to certain ones of said terminal connectors, and a sub-assembly insert telescopically slidable into the open end of the mandrel and provided at its leading end portion with electrically conductive terminal connectors each for contacting one of the terminal connectors carried by said closure, said sub-assembly insert containing electrical components electrically connected to the terminal connectors of the sub-assembly insert for providing storage and/or read-out functions for said magnetic material.

7. A magnetic memory device comprising, an electrically conductive tubular mandrel provided with a series of slots in its peripheral surface each parallel to the axis of the mandrel, electrically conductive terminals carried by said mandrel, a plurality of electrical conductors each electrically connected to one of said terminals and mounted in one of said slots and provided with a helical layer of magnetic material, a plurality of electrically conductive shield rings closely fitted on the outside of the mandrel in spaced apart relation, a plurality of solenoids each wound around the mandrel between adjacent ones of said shield rings and encircling said electrical conductors, and a sub-assembly insert telescopically slidable into the mandrel and provided with a group of electrically conductive terminals each for contacting one of the terminals carried by said mandrel, said sub-assembly insert containing electrical components electrically connected to the terminals of the sub-assembly insert for providing storage and/or read-out functions for said magnetic material.

8. A magnetic memory device comprising, an electrically conductive tubular mandrel provided with a series of slots in its peripheral surface, electrically conductive terminals carried by said mandrel, a plurality of memory elements each comprising an electrical conductor electrically connected to one of said terminals and mounted in one of said slots and provided with a coaxial layer of magnetic material along a substantial portion of its length, a plurality of electrically conductive shield rings closely fitted on the outside of the mandrel in spaced apart relation, a plurality of solenoids each wound around the mandrel between adjacent ones of said shield rings and encircling said memory elements, and a sub-assembly insert telescopically slidable into the mandrel and provided with a group of electrically conductive terminals each for contacting one of the terminals carried by said mandrel, said sub-assembly insert containing electrical components electrically connected to the terminals of the sub-assembly insert for providing storage and/or read-out functions for said memory elements.

9. A magnetic device comprising, an electrically conductive tubular mandrel provided with a series of slots in its peripheral surface each parallel to the axis of the mandrel, a plurality of electrical conductors each mounted in one of said slots and provided wtih a layer of magnetic material having a helical easy direction of magnetization, a plurality of electrically conductive shield rings closely fitted on the outside of the mandrel in spaced apart relation, and a plurality of solenoids each wound around the mandrel between adjacent ones of said shield rings and encircling said electrical conductors.

10. A magnetic memory device comprising, an electrically conductive supporting structure provided with a series of slots in one of its surfaces, a plurality of electrical conductors each mounted in one of said slots and provided with a layer of magnetic material, a plurality of electrically conductive shielding members on said supporting structure in spaced apart relation, and a plurality of solenoids each wound around said supporting structure between adjacent ones of said shielding members and encircling said electrical conductors and magnetic material thereon.

11. A magnetic memory device comprising, an electrically conductive tubular mandrel provided with a series of slots in its peripheral surface each parallel to the axis of the mandrel, a plurality of electrical conductors each mounted in one of said slots and provided with a layer of magnetic material having a helical easy direction of magnetization, and a plurality of solenoids wound around the mandrel in spaced apart relation and encircling said electrical conductors.

12. A magnetic memory device comprising, a supporting structure having a layer of electrically conductive material provided with a series of positioning means on at least one of its surfaces for guiding electrical wire conductors, a plurality of said electrical wire conductors each mounted in one of said positioning means and provided with a layer of magnetic material, and a plurality of solenoids wound around said supporting structure in spaced apart relation and encircling said electrical conductors and magnetic material thereon.

13. A magnetic memory device comprising, an electrically conductive supporting structure, a plurality of electrical conductors positioned on said supporting structure and each provided with magnetic material, and at least one solenoid wrapped around said supporting structure and the electrical conductors and crossing over said magnetic material of each conductor.

14. A magnetic memory device comprising first and second memory structures, said first memory structure comprising, a first elongated electrically conductive mandrel provided with an axial opening therethrough, a group of wire memory elements positioned around the periphery of the mandrel in spaced apart relation, and a group of solenoids each wrapped around the mandrel and encircling said wire memory elements, said second memory structure comprising, a second elongated electrically conductive mandrel, a second group of wire memory elements positioned around the periphery of the second mandrel, and a second group of solenoids each wrapped around the second mandrel and encircling said wire memory elements of the second group of wire memory elements, said second memory structure mounted substantially coaxially in the axial opening of said first mandrel.

15. A magnetic memory device comprising first and second memory structures, said first memory structure comprising, a first elongated electrically conductive mandrel provided with an opening therethrough extending in the direction of the long dimension of the mandrel, a group of wire memory elements positioned around the periphery of the mandrel in spaced apart relation, a group of solenoids each wrapped around the mandrel and encircling said wire memory elements, and electrically conductive shielding means between adjacent solenoids, said second structure comprising, a second elongated electrically conductive mandrel, a second group of wire memory elements positioned around the periphery of the second mandrel, and a second group of solenoids each wrapped around the second mandrel and said wire memory elements of the second group of wire memory elements, said second memory structure inserted telescopically into the opening of said first mandrel.

16. A magnetic memory device comprising, a layer of electrically conductive non-magnetic material, a first group of wire memory elements adjacent to a surface of said layer of material, a second group of wire memory elements adjacent to the opposite surface of said layer of material, and a plurality of solenoids each encircling the layer of material and both groups of wire memory elements.

17. A magnetic memory device comprising, a layer of electrically conductive material, a first group of magnetic memory elements adjacent to a surface of said layer of material, a second group of magnetic memory elements adjacent to the opposite surface of said layer of material, and a solenoid encircling the layer of material and both groups of magnetic memory elements.

References Cited in the file of this patent

UNITED STATES PATENTS 3,083,354 Bobeck ________________ Mar. 26, 1963